US008774407B2

(12) United States Patent
Eklund et al.

(10) Patent No.: US 8,774,407 B2
(45) Date of Patent: Jul. 8, 2014

(54) SYSTEM AND METHOD FOR EXECUTING ENCRYPTED BINARIES IN A CRYPTOGRAPHIC PROCESSOR

(75) Inventors: Mark W. Eklund, Knoxville, TN (US); Jared B. Pendleton, Knoxville, TN (US); Richard Brian Livingston, Knoxville, TN (US); Robert T. Bell, Bountiful, UT (US); Steven Joseph Rich, Maryville, TN (US)

(73) Assignee: Cisco Technology, Inc., San Jose, CA (US)

( * ) Notice: Subject to any disclaimer, the term of this patent is extended or adjusted under 35 U.S.C. 154(b) by 479 days.

(21) Appl. No.: 12/868,394

(22) Filed: Aug. 25, 2010

(65) Prior Publication Data
US 2012/0054499 A1    Mar. 1, 2012

(51) Int. Cl.
*H04K 1/00* (2006.01)
*H04L 9/00* (2006.01)

(52) U.S. Cl.
USPC ............................................ 380/255; 380/277

(58) Field of Classification Search
USPC .................................... 713/189; 380/255, 277
See application file for complete search history.

(56) References Cited

U.S. PATENT DOCUMENTS

| | | | | |
|---|---|---|---|---|
| 8,316,243 B2* | 11/2012 | Henry et al. | | 713/189 |
| 2002/0114452 A1* | 8/2002 | Hamilton | | 380/42 |
| 2005/0027994 A1* | 2/2005 | Sai | | 713/189 |
| 2006/0288215 A1* | 12/2006 | Takemura et al. | | 713/175 |
| 2007/0014414 A1* | 1/2007 | Benedikt | | 380/278 |
| 2007/0180271 A1* | 8/2007 | Hatakeyama et al. | | 713/193 |
| 2008/0165959 A1* | 7/2008 | Hong et al. | | 380/200 |
| 2008/0205651 A1* | 8/2008 | Goto et al. | | 380/277 |
| 2009/0232304 A1* | 9/2009 | King | | 380/210 |
| 2009/0285390 A1* | 11/2009 | Scherer et al. | | 380/44 |

OTHER PUBLICATIONS

Maxim Integrated Products, "High-Performance, Secure, 32-Bit MIPS Microcontroller Supporting Linux OS," Rev. 1; Feb. 2010, 2 pages; http://datasheets.maxim-ic.com/en/ds/IC0400C778BF-USIP.pdf.
MIPS Technologies, Inc., "MIPS32® 4KSd™: Secure Data Core," © 2005, 2 pages; http://www.mips.com/media/files/4ksd.pdf.

* cited by examiner

*Primary Examiner* — Mohammad W Reza
(74) *Attorney, Agent, or Firm* — Patent Capital Group

(57) ABSTRACT

An example method is provided and includes providing an encrypted image to a central processing unit of an integrated circuit and decrypting the encrypted image using a cryptographic key element. The cryptographic key element is embedded within the integrated circuit. The method also includes evaluating the decrypted image in order to verify its authenticity, and executing the decrypted image if the decrypted image is successfully verified. In more particular embodiments, the verification includes utilizing an executable and linkable format (ELF) to signify that encryption has been enabled for at least a portion of the encrypted image. A processor within the integrated circuit can be provided with the cryptographic key element that corresponds to a product family of devices. The method can also include providing a corresponding image of the decrypted image to an external memory of the integrated circuit.

17 Claims, 5 Drawing Sheets

SYSTEM AND METHOD FOR EXECUTING ENCRYPTED BINARIES IN A CRYPTOGRAPHIC PROCESSOR

TECHNICAL FIELD

This disclosure relates generally to the field of processors and, more particularly, to executing encrypted binaries in a cryptographic processor.

BACKGROUND

The existence of counterfeit technology is a significant concern in today's electronic marketplace. For example, it can be difficult to determine the authenticity of software in a computer device. In addition, reverse engineering of binary images can often expose weaknesses of a computer system. These security breaches can render a computer system vulnerable to being compromised and/or exploited for various unlawful activities. As a general proposition, addressing these security issues, without sacrificing system performance, presents a significant challenge to equipment vendors, device manufacturers, and system designers alike.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

An example method is provided and includes providing an encrypted image to a central processing unit of an integrated circuit, and decrypting the encrypted image using a cryptographic key element. The cryptographic key element is embedded within the integrated circuit. The method further includes evaluating the decrypted image in order to verify its authenticity, and executing the decrypted image if the decrypted image is successfully verified. In more particular embodiments, the verification includes utilizing an executable and linkable format (ELF) to signify that encryption has been enabled for at least a portion of the encrypted image.

In more specific implementations, a processor within the integrated circuit can be provided with the cryptographic key element that corresponds to a product family of devices. The method can also include providing a corresponding image of the decrypted image to an external memory of the integrated circuit. The corresponding image is a re-encrypted image of the decrypted image, where a re-encrypting of the decrypted image employs a third cryptographic key element.

In other embodiments, a cipher can be included in header information associated with the encrypted image, and the header information includes a decrypted key. The method can further include notifying the central processing unit of an error condition if the decrypted image is not successfully verified. In more particular embodiments, the cryptographic key element is used in a symmetric encryption decryption operation involving a hashing element, which is provided within the integrated circuit.

Example Embodiments

Figure 1:
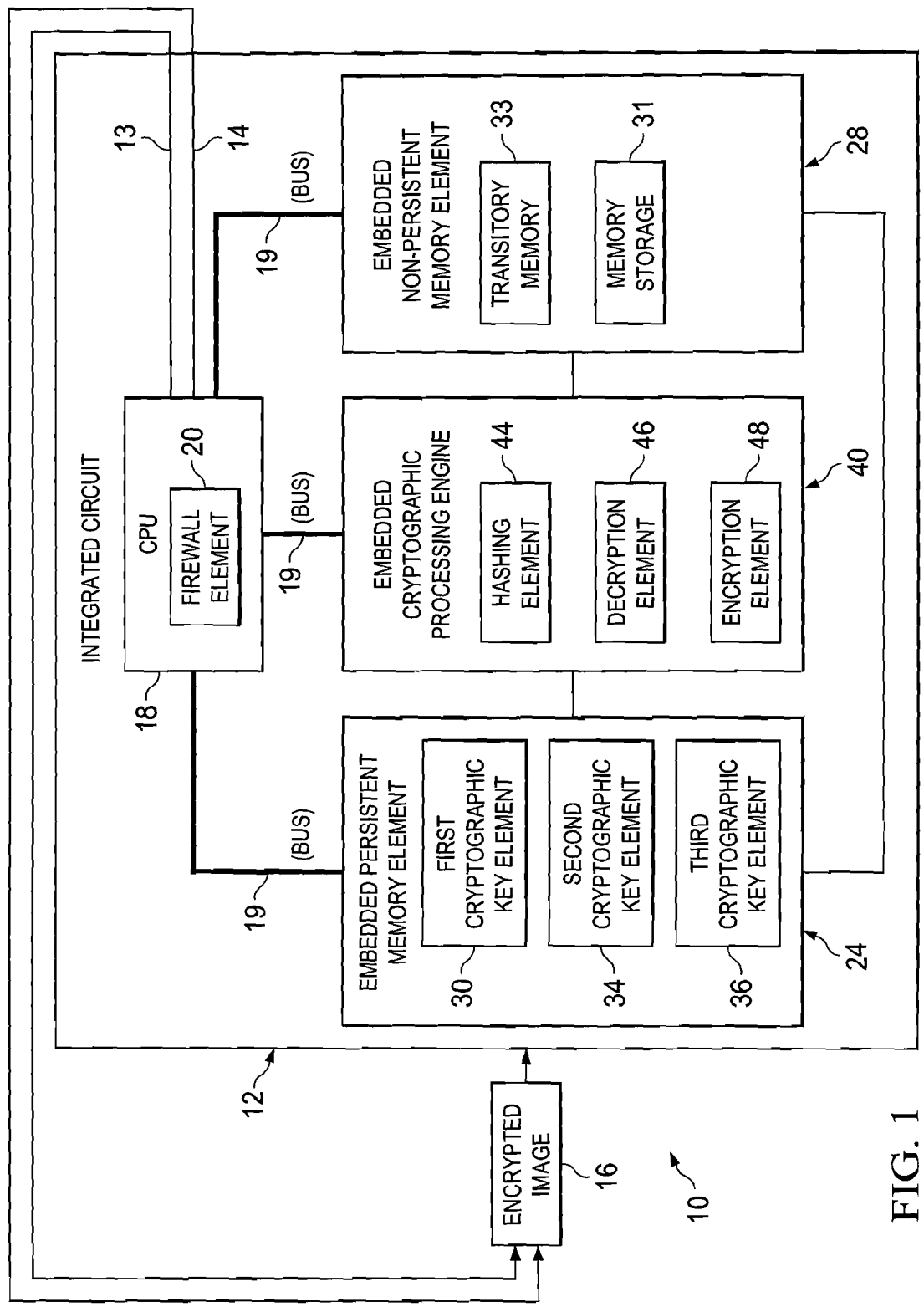
FIG. 1 is a simplified block diagram of a system for executing encrypted binaries in accordance with one embodiment of the present disclosure.

Turning to FIG. 1, FIG. 1 is a simplified block diagram illustrating a system 10 for executing encrypted binaries on a cryptographic processor in accordance with one embodiment. System 10 can be configured to perform binary (e.g., image) decryption, verification, and integrity validation in the context of evaluating the authenticity of an encrypted image 16. [Note that, as used herein in this Specification, the term 'authenticity' is a broad term meant to encompass any type of validity check, integrity verification, and/or accuracy inspection in the context of evaluating a given image, its associated instructions, its formatting, its contents, etc. Similarly, the term 'evaluating' is meant to encompass any type of integrity validating, verifying, examining and/or determining the authenticity of binaries (i.e., images) and/or their associated instructions, contents, format, etc. Such an evaluation of a corresponding image can be performed in order to ensure that the images are what they purport to be and/or what they were originally intended for (e.g., they have not been modified, compromised, altered, impermissibly changed, improperly copied or switched, etc.).]

System 10 may include an integrated circuit 12, which may further include an embedded persistent memory element (PME) 24, an embedded non-persistent memory element (NPME) 28, and an embedded cryptographic processing engine (CPE) 40. In the particular example of FIG. 1, system 10 further includes a central processing unit (CPU) 18, which may include a firewall element 20 that can offer certain antivirus and/or security protections for associated devices. CPU 18 can be coupled to embedded PME 24, embedded NPME 28, and embedded CPE 40 through a set of data buses 19. CPU 18 can also include an external data bus 13 and an external address bus 14.

In one embodiment, embedded CPE 40 can include a hashing element 44, a decryption element 46, and an encryption element 48. Embedded PME 24 can include a first cryptographic key element 30, a second cryptographic key element 34, and a third cryptographic key element 36. Embedded NPME 28 can include a memory for executable instructions to be decrypted and validated. Embedded NPME 28 can further include a memory storage 31 and a transitory memory 33 to be used in encryption, decryption, and validation operations. Note that, in certain contexts of the present disclosure, the term 'embedded' includes being fixed within a surrounding mass or object, or simply provided in conjunction with a given article such as integrated circuit 12. For example, PME 24, NPME 28, and embedded CPE 40 can be suitably fixed (i.e., embedded) within a surrounding mass of integrated circuit 12. Additionally, a persistent memory element (such as that illustrated in FIG. 1) is capable of retaining memory information (while maintaining data integrity) through power cycles of the memory element.

In the context of environments in which system 10 would operate, the existence of counterfeit hardware makes it difficult to determine the authenticity of a deployed piece of software, a provisioned device, etc. This is especially true when the components being used in a given architecture are identical to the copied device. Furthermore, reverse engineering of binary images exposes weaknesses in a software system, which makes such a system vulnerable to exploitation.

In accordance with certain teachings of the present disclosure, system 10 can include embedded cryptographic keys that are provided within integrated circuit 12 (e.g., a computer processor) during the manufacturing process. Such a process can include producing customer specific non-commodity CPUs, or other devices manufactured based on particular needs. The keys can be used during the software manufacturing process to encrypt an instruction stream. The encrypted binaries can allow system 10 to execute protected binaries and, thereby, remove the ability of a given attacker to glean information propagating on a given memory bus. Note that such a protection strategy can allow a hardware producer to authenticate their hardware on which their products are being executed and, further, protect the software from reverse engineering efforts. Because the original binary is encrypted and signed, static modification of the instruction stream is no longer possible. Moreover, embedded CPE 40 can operate directly with encrypted software, and this prevents a dynamic runtime modification because the encryption is still valid after initial verification.

Note that cryptographic systems can be classified either as a symmetric encryption-decryption or as an asymmetric encryption-decryption. Regarding symmetric encryption-decryption, a single key can be used to both encrypt and decrypt a given message. One problem with symmetric encryption-decryption relates to the security of a single key. For example, if a malicious intruder knew that single key, then the integrity and/or authenticity of a message could be compromised. In certain instances, this problem can be lessened though implementation of a confidential hash function in a given device for verification and for authentication purposes.

For asymmetric encryption-decryption, two keys are generated and are typically held by various parties, where both keys would be used in the encryption and decryption process. The keys can include a public key (which is kept confidential and which is commonly the subject of secrecy restrictions) and a private key, which is similarly restricted. In many cases, the recipient is the only party that would have knowledge of the private key. In general terms, for ensuring data integrity, the public key can be used to encrypt a message for a given recipient, where the private key can decrypt the encrypted message intended for the recipient. Alternatively, in the context of signature validation, the private key may be used to encrypt a message, while the public key is used to decrypt a message. Typically, in a symmetric key operation, the sender and the receiver would have a shared key, which is set up in advance and which is kept secret from other parties. The sender uses this key for encryption, and the receiver uses the same key for decryption. In an asymmetric key operation, there are two separate keys: a public key is published and enables any sender to perform encryption, while a private key is kept secret by the receiver and enables only the user to perform the correct decryption. While ubiquitous, these security key mechanisms fail to account for more sophisticated intrusions, nor do they properly address attack mechanisms that are able to glean information from data buses (such as those illustrated in FIG. 1).

In certain embodiments, system 10 can address these concerns (and others) by embedding multiple cryptographic key elements in integrated circuit 12. The cryptographic key elements can be used in decryption and validation operations, as described below. Hence, an intruder has no access to the keys, to the decryption and validation processes, to the various other embedded memory elements, or to embedded data busses, which are systematically used to convey information relevant to the decryption and validation process.

In one embodiment of system 10, first, second, and third cryptographic key elements represent a single key for use with symmetric decryption, authenticity, and integrity verifications. In another embodiment, first, second, and third cryptographic key elements are dual public-private key pairs for provisioning with asymmetric decryption. In yet further embodiments, the cryptographic key elements are various combinations of single and dual key pairs for a combination of symmetric and asymmetric decryption, authenticity, and integrity verifications.

In one embodiment, first cryptographic key element 30 is a key that is shared by a family of integrated circuits (e.g., designated by a manufacturer), where each family member could employ the same first key cryptographic element: regardless of whether the key would be used for a symmetric or an asymmetric decryption and validation. In another embodiment, each instance of integrated circuit 12 (and/or each processor) has its own unique second cryptographic key element 34 and its own third cryptographic key element 36, which is employed for encrypting instructions back to an external non-persistent memory after an image decryption and a validation has occurred. Third cryptographic key element 36 can then be used in decrypting the instructions that were previously placed into an external non-persistent memory, as is described below.

Returning to FIG. 1, and in the context of an example operation, encrypted image 16 can be requested by CPU 18 over external address bus 14. Encrypted image 16 can be sent to CPU 18 via external data bus 13. In one embodiment, encrypted image 16 is encrypted with first cryptographic key element 30. In another embodiment, encrypted image 16 is encrypted with second cryptographic key element 34. After passing through firewall element 20, CPU 18 can select the appropriate cryptographic key element to be sent via data bus 19. CPU 18 can also send encrypted image 16 to a set of executable instructions (e.g., included within memory storage 31) of embedded NPME 28. CPU 18 can then command embedded CPE 40 to both decrypt and to validate encrypted image 16, where this can include checking the authenticity of encrypted image 16 (i.e., verifying that encrypted image 16 is what it purports to be, its integrity, etc.). Further, this operation can include using any appropriate cryptographic key element, where associated calculations may be performed in transitory memory 33.

In a particular embodiment, when performing symmetric decryption and validation, embedded CPE 40 employs hashing element 44, which may include a hash-based message authentication code (HMAC) that can be used in combination with the various cryptographic key elements. When performing asymmetric decryption and validation, embedded CPE 40 employs decryption element 46. In a further embodiment, decryption element 46 can also be used when decrypting instructions that have been previously encrypted by third cryptographic key element 36. In other embodiments, encryption element 48 is used when re-encrypting an image file to be sent from integrated circuit 12 to an external non-persistent memory, as is described below with reference to FIG. 2.

In the event that both the integrity verification and the image authentication succeeds (i.e., there is a sufficient level of validation such that the image's authenticity has been confirmed), CPU 18 is notified of this result by embedded CPE 40. Subsequently, CPU 18 can send authenticated and verified instructions of the decrypted image over external address bus 14 to an external non-persistent memory. Alternatively, CPU 18 can execute the instructions of the decrypted binary upon binary image validation, and elect to send the authenticated and verified instructions back over external address bus 14 to any suitable destination within (or external to) integrated circuit 12. However, if the authentication and data validity is not successful, CPU 18 can be notified of this result. CPU 18 can then take any appropriate action (e.g., aborting any execution or processing of the image).

In one embodiment, executable and linkable format (ELF) is employed to signal that encryption has been enabled in some (or in all) of the binary image. This indication could be detected by CPU 18. As mentioned above, integrated circuit 12 can be embedded with at least one of two cryptographic key elements, where such embedding can be provided by a software or hardware vendor. The key elements may be arranged in some type of hierarchy, or organized in any appropriate manner. For example, first cryptographic element 30 could correspond to a general product family, and second cryptographic element 34 could correspond to each individual processor (or integrated circuit) to further enable specific types of deployments. Such cryptographic key elements can correspond to both asymmetric and symmetric decryption.

In regards to an example chronology of a particular implementation of system 10, at software build time, a product vendor can encrypt an image using any one of cryptographic key elements 30, 34, 36. If asymmetric decryption-encryption is employed, then a public key can be used. Generally, for asymmetric decryption encryption operations, when encrypted software is loaded onto a device, system 10 is configured to decrypt all sections encrypted with its own private keys, as is discussed herein.

In one embodiment, since a decryption process can add non-trivial time to memory management, two levels of encryption can be employed. A cryptographically strong cipher can be included in header information of encrypted image 16, which can contain another, more easily decrypted key. A cipher can be a simple algorithm for performing encryption or decryption, where a series of defined steps can be followed as a procedure. In a general sense, the cipher is code that verifies the authenticity of an image. Note that in symmetric key algorithms (e.g. private-key cryptography), the same key is used for encryption and decryption. In asymmetric key algorithms (e.g., public-key cryptography), two different keys are used for encryption and decryption. Ciphers can be classified as block ciphers that encrypt blocks of data of fixed size, and stream ciphers that encrypt continuous streams of data. The more easily decrypted key (identified previously) can be used during operations to mitigate a performance impact added by the encryption process. Stated differently, embedded CPE 40 can use one of cryptographic keys elements 30, 34, 36 to decrypt a key embedded in a header. This decrypted header key can then be used for any ongoing decryption processes.

For asymmetric decryption activities, any private keys associated with cryptographic key elements 30, 34, 36 are not made available to components external to integrated circuit 12. These private keys can contain various protection mechanisms to prevent their theft (e.g., via chip scraping). As discussed above, CPU 18 offers no interface for accessing private keys and, further, provides a protected space for the actual keys. In one embodiment, encrypted image 16 is read from a compact disk, or some other non-coupled storage device. In other embodiments, encrypted image 16 is loaded into CPU 18 as a prerequisite to subsequent execution of encrypted instructions associated with encrypted image 16.

Figure 2:
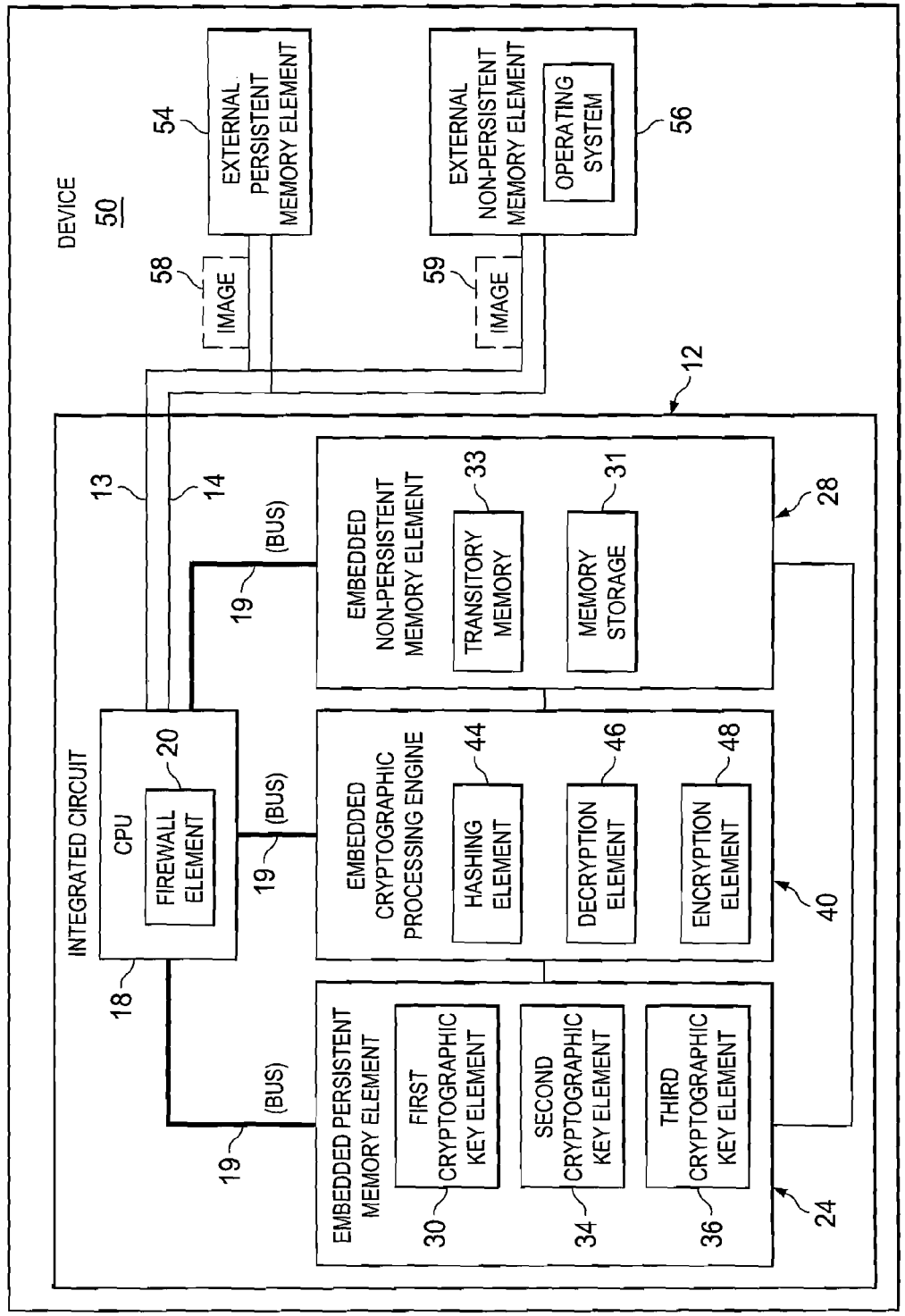
FIG. 2 is a simplified block diagram illustrating details associated with the system in accordance with one embodiment of the present disclosure.

Turning to FIG. 2, FIG. 2 is a simplified block diagram illustrating a device 50, which may include an external persistent memory and a non-persistent memory in accordance with one embodiment of the present disclosure. More specifically, device 50 includes integrated circuit 12 of system 10, along with an external persistent memory element (XPME) 54 and an external non-persistent memory element (XNME) 56 coupled to integrated circuit 12 over external data bus 13 and external address bus 14. In FIG. 2, XNME 56 contains an example of an encrypted image 58, which could take virtually any form.

Device 50 is representative of an electronic processing element, which can include a personal computer, a personal digital assistant (PDA), a workstation, a laptop or electronic notebook, a server, a network appliance of any kind (e.g., routers, switches, gateways, bridges, loadbalancers, firewalls, inline service nodes, proxies, etc.), a cellular telephone, an iPhone, an IP phone, or any other device, component, element, or object capable of performing processing. Device 50 can also include more sophisticated devices that employ any type of CPU such as a sensor, a control system, etc. Device 50 may include one or more processors and/or integrated circuits and, in certain embodiments, be capable of exchanging information in a network environment (wired or wireless).

In one example operation, at the request of integrated circuit 12, XPME 54 sends encrypted image 58 to integrated circuit 12. Embedded CPE 40 then decrypts encrypted image 58 and performs its various validations for integrity and authenticity. If the decrypted image passes the validation check, then integrated circuit 12 may perform any number of operations such as executing the decrypted instructions, conveying a validated image 59 to the XNME 56, or both. In a further embodiment, validated image 59 can be re-encrypted using third cryptographic element 36, before being conveyed to XNME 56.

Figure 3:
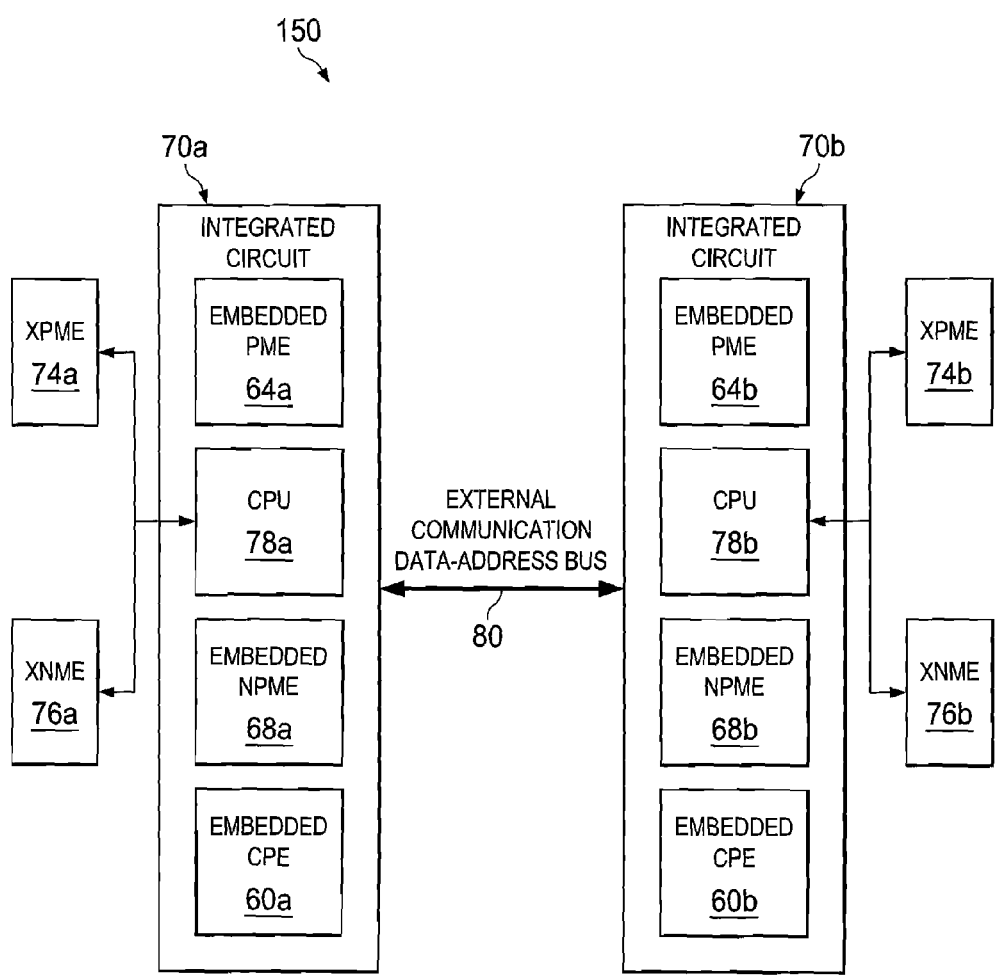
FIG. 3 is a simplified block diagram of another system associated with executing encrypted binaries in accordance with one embodiment of the present disclosure.

Turning to FIG. 3, FIG. 3 illustrates an embodiment of a system 150 for a plurality of integrated circuit 70a, 70b. In one embodiment, each integrated circuit 70a, 70b includes its own embedded persistent memory element (PME) 64a-b, embedded NPME 68a-b, embedded CPE 60a-b, and CPU 78a-b. Coupled to each respective CPU 78a-b of each integrated circuit 70a, 70b is its own respective XPME 74a-b and XNME 76a-b, where this infrastructure would have the same capabilities as those described previously. Also, coupled between integrated circuits 70a, 70b is a combined external communication data address bus 80, which allows integrated circuits 70a, 70b to communicate with each other. Note that system 150 can behave in a manner similar to that described above with reference to FIGS. 1-2, but simply with two integrated circuits being accommodated in the architecture. For example, each respective integrated circuit 70a-b can include cryptographic elements, which can be suitably accessed and utilized to achieve the teachings of the present disclosure.

Figure 4:
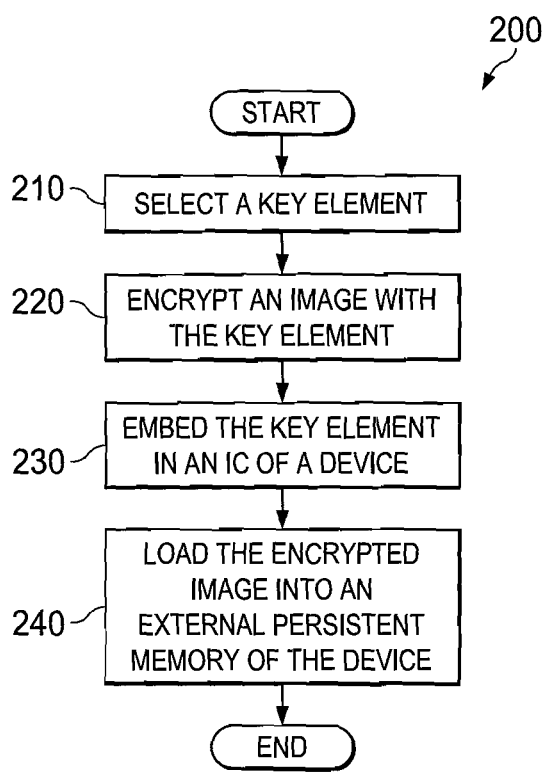
FIG. 4 is a simplified flowchart related to the system in accordance with one embodiment of the present disclosure.

Turning to FIG. 4, FIG. 4 is a flowchart illustrating an example method 200 associated with the present disclosure. This generic flow is associated with operations relating to an embedding of keys, an encryption of an image, and a loading of an encrypted image into a device in accordance with one embodiment of the present disclosure. The flow may begin at step 210, where a cryptographic key element is selected. For example, this can be first cryptographic key element 30, or second cryptographic key element 34. Note that such a selection is performed whether an encryption is symmetric or asymmetric. In a further embodiment, multiple cryptographic key elements can be selected and/or employed at this juncture.

In step 220, an image (or at least a part thereof) can be encrypted using an encrypted key element, where an encrypted image is generated. For example, if encryption occurs with first encryption key element 30, devices of a given family would be receiving the same key of first encryption key element 30. Alternatively, if second cryptographic key element 34 were used, a received cryptographic key element could be unique for each device of the family. In step 230, the cryptographic key element or cryptographic key elements are embedded within an integrated circuit of a device. For example, first cryptographic key element 30 and second cryptographic key element 34 can be embedded within integrated circuit 12 of device 50 of FIG. 2. Generally, this embedding hinders the ability of an unauthorized party to gain access to the cryptographic key elements. In step 240, the encrypted image is loaded into a persistent memory of the device. In some embodiments, the persistent memory is an external persistent memory such as that being depicted in FIG. 2.

Figure 5:
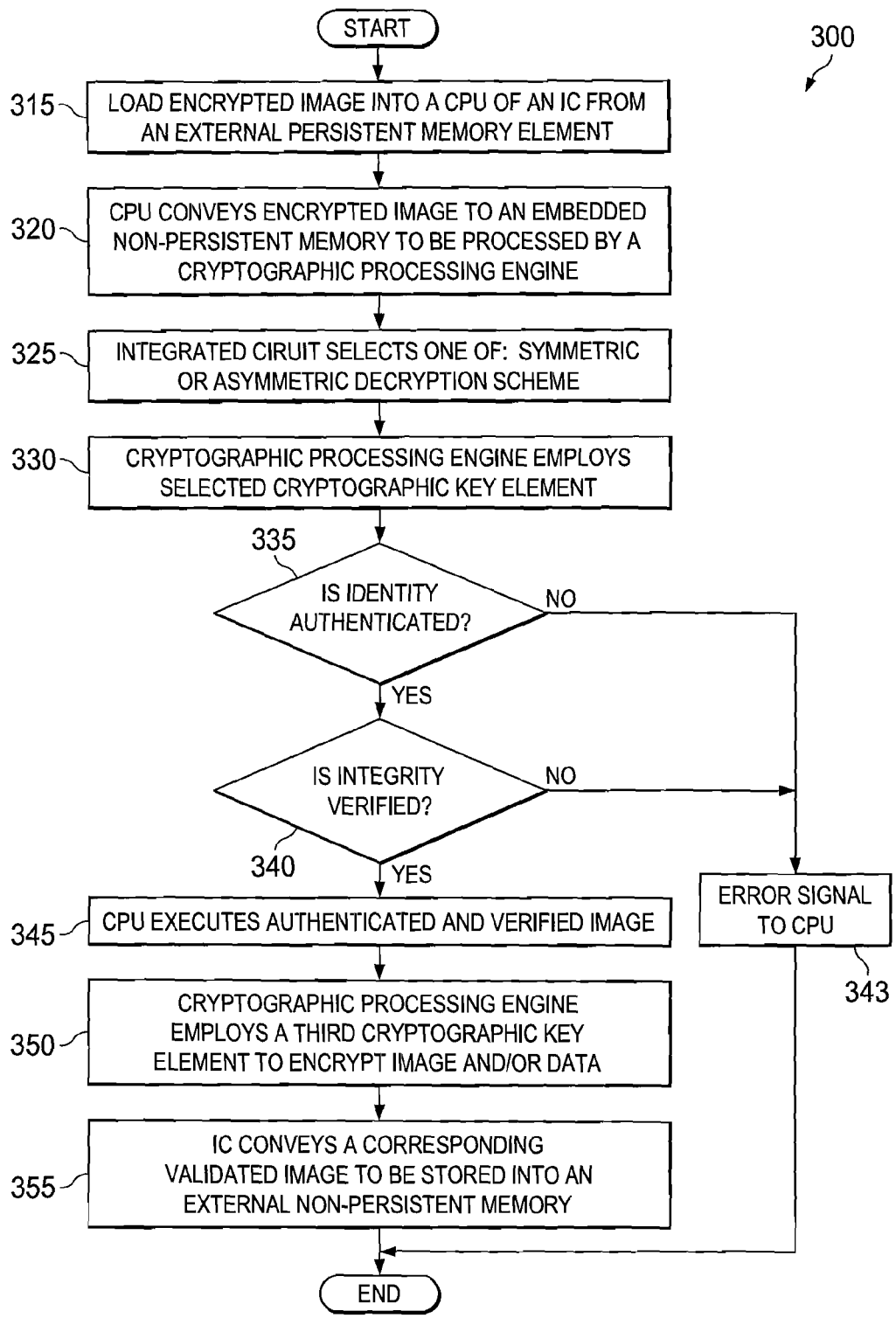
FIG. 5 is another simplified flowchart related to the system in accordance with one embodiment of the present disclosure.

Turning to FIG. 5, FIG. 5 illustrates a flowchart illustrating an example method 300 associated with particular operations for an encrypted image. In step 315, an encrypted image can be loaded from an external persistent memory, such as from an external persistent memory of an integrated circuit. For example, encrypted image 58 can be loaded into integrated circuit 12 of device 50 from XPME 54. In an alternative embodiment, the encrypted image is first loaded into XNME 56, and then loaded into integrated circuit 12. In step 320, a CPU conveys the encrypted image to an embedded non-persistent memory to be processed by a cryptographic processing engine. For example, CPU 18 can convey encrypted image 16 to embedded NPME 28 to be processed by embedded CPE 40.

In step 325, the integrated circuit can employ a symmetric or an asymmetric processing scheme, as appropriate. In one embodiment, an indication of whether symmetric or asymmetric encoding is to be used, and which key is to be used, can be included in header information of the encrypted image. For example, encrypted image 16 can contain instructions to integrated circuit 12 as to whether first cryptographic key element 30 or second cryptographic key element 34 is to be employed by embedded CPE 40. The selection of symmetric or asymmetric decryption can be performed by CPU 18, or by any other part of integrated circuit 12.

In step 330, a cryptographic processing engine can employ a selected key element, such as first cryptographic key element 30 or second cryptographic key element 34, for decryption purposes. In a further embodiment, embedded CPE 40 employs a third key element for decryption of previously validated images, such as third cryptographic key element 36. In step 335, it is determined whether the decrypted image is properly authenticated. This can be, for example, through employment of a hash function with symmetric or asymmetric decryption, or through appropriate use of private and/or closely held public keys for asymmetric decryptions. If authentication is valid, method 300 advances to step 340, and if authentication is not valid, method 300 advances to step 343. For step 343, an error signal can be conveyed to a CPU from a cryptographic processing engine (e.g., from embedded CPE 40 to CPU 18), where further processing or execution would end.

For step 340, an evaluation is made as to whether the integrity of a received image has been properly verified. This can be, for example, through usage of a hash function with symmetric decryption, or through appropriate use of private and closely held public keys for asymmetric decryption. For example, one or more check bits can be included in an encrypted image, where if the check bits were not correct after decryption, this inconsistency would flag an unauthorized modification. This could cause an error indication that would notify any component of a problem with an execution of this particular image.

In step 345, after a successful evaluation (e.g., the identity and integrity of the image has been authenticated), a CPU can execute the instructions of the received binary image. For example, CPU 18 can execute the authenticated instructions that were originally encrypted in encrypted image 16, where these instructions have been properly decrypted and validated by embedded CPE 40. In step 350, a cryptographic processing engine can employ a third key element to re-encrypt the image. For example, embedded CPE 40 can use third cryptographic key element 36 to re-encrypt this particular image. In step 355, the validated images are stored in external non-persistent memory. These images can be further processed, sent to another destination, or be queued for further execution by a CPU. In particular embodiments, the image may be re-encrypted before being placed in an external non-persistent memory.

Note that in certain example implementations, some of the various functions or processes outlined herein may be implemented by logic encoded in one or more tangible media (e.g., embedded logic provided in an application specific integrated circuit (ASIC)), digital signal processor (DSP) instructions, or software or firmware (potentially inclusive of object code and source code) to be executed by a processor, or other similar machine, etc.). A memory element (such as shown in FIGS. 1-3) can store data used for the various operations outlined herein.

This includes a memory element being able to store software, logic, code, and/or processor instructions that can be executed to carry out the activities or code execution described or discussed in this Specification. A processor can execute any type of instructions associated with the data to achieve the operations detailed herein in this Specification. In one example, a processor (as shown by embedded CPE 40 of FIG. 1) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA)), an erasable programmable read only memory (EPROM), an electrically erasable programmable ROM (EEPROM)) or an ASIC that includes digital logic, software, code, electronic instructions, or any suitable combination thereof.

In one example implementation, device 50 can include software in order to achieve the intelligent encryption functions discussed herein. Device 50 can similarly include memory elements to be used in achieving intelligent encryption functions discussed herein. Device 50 may further keep information in any suitable memory element (random access memory (RAM), ROM, EPROM, EEPROM, ASIC, etc.), software, hardware, or in any other suitable component, device, element, or object where appropriate and based on particular needs. Any possible memory items (e.g., database, table, cache, etc.) should be construed as being encompassed within the broad term memory element. Similarly, any of the potential processing elements, modules, and machines described in this Specification should be construed as being encompassed within the broad term processor.

Note that with the examples provided herein, interaction may be described in terms of two or three elements. However, this has been done for purposes of clarity and example only. In certain cases, it may be easier to describe one or more of the functionalities of a given set of flows by only referencing a limited number of integrated circuit and/or processor elements. It should be appreciated that communication system 10 (and its teachings) are readily scalable and can accommodate any number of devices or flows, as well as more complicated/sophisticated arrangements and configurations. Accordingly, the examples provided herein should not limit the scope or inhibit the broad teachings of communication system 10 as potentially applied to a myriad of other architectures.

It is also important to note that the steps discussed with reference to FIGS. 1-5 illustrate only some of the possible scenarios that may be executed by, or within, communication system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the present disclosure.

Although the present disclosure has been described in detail with reference to particular embodiments, it should be understood that various other changes, substitutions, and alterations may be made hereto without departing from the spirit and scope of the present disclosure. Virtually any configuration that seeks to intelligently control encryption operations could enjoy the benefits of the present disclosure. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

What is claimed is:

1. A method, comprising:
providing an encrypted image to a central processing unit of an integrated circuit;
decrypting the encrypted image using a first cryptographic key element, wherein the first cryptographic key element and a second cryptographic key element are embedded within the integrated circuit during a manufacturing process associated with the integrated circuit, wherein the first cryptographic key element and the second cryptographic key element are arranged in a hierarchy in which the first cryptographic element corresponds to a product family of devices and the second cryptographic element corresponds to the integrated circuit for enabling a particular type of deployment;
utilizing an executable and linkable format (ELF) to signify that encryption has been enabled for at least a portion of the encrypted image;
evaluating the decrypted image in order to verify its authenticity; and
executing the decrypted image if the decrypted image is successfully verified.

2. The method of claim 1, wherein a processor within the integrated circuit is provided with the first cryptographic key element that corresponds to a product family of devices, and wherein the processor is further provided with an additional cryptographic key element that corresponds to a unique identifier of the processor.

3. The method of claim 1, further comprising:
providing a corresponding image of the decrypted image to an external memory of the integrated circuit, wherein the corresponding image is a re-encrypted image of the decrypted image, and wherein a re-encrypting of the decrypted image employs a third cryptographic key element.

4. The method of claim 1, wherein a cipher is included in header information associated with the encrypted image, and wherein the header information includes a decrypted key.

5. The method of claim 1, wherein the first cryptographic key element is used in a symmetric encryption decryption operation involving a hashing element, which is provided within the integrated circuit.

6. The method of claim 1, further comprising:
notifying the central processing unit of an error condition if the decrypted image is not successfully verified.

7. Logic encoded in one or more non-transitory tangible media that includes code for execution and when executed by a processor operable to perform operations comprising:
providing an encrypted image to a central processing unit of an integrated circuit;
decrypting the encrypted image using a first cryptographic key element, wherein the first cryptographic key element and a second cryptographic key element are embedded within the integrated circuit during a manufacturing process associated with the integrated circuit, wherein the first cryptographic key element and the second cryptographic key element are arranged in a hierarchy in which the first cryptographic element corresponds to a product family of devices and the second cryptographic element corresponds to the integrated circuit for enabling a particular type of deployment;
utilizing an executable and linkable format (ELF) to signify that encryption has been enabled for at least a portion of the encrypted image;
evaluating the decrypted image in order to verify its authenticity; and
executing the decrypted image if the decrypted image is successfully verified.

8. The media of claim 7, wherein a processor within the integrated circuit is provided with the first cryptographic key element that corresponds to a product family of devices, and wherein the processor is further provided with an additional cryptographic key element that corresponds to a unique identifier of the processor.

9. The media of claim 7, the operations further comprising:
providing a corresponding image of the decrypted image to an external memory of the integrated circuit, wherein the corresponding image is a re-encrypted image of the decrypted image, and wherein a re-encrypting of the decrypted image employs a third cryptographic key element.

10. The media of claim 7, wherein a cipher is included in header information associated with the encrypted image, and wherein the header information includes a decrypted key.

11. The media of claim 7, wherein the first cryptographic key element is used in a symmetric encryption decryption operation involving a hashing element, which is provided within the integrated circuit.

12. The media of claim 7, the operations further comprising:
  notifying the central processing unit of an error condition if the decrypted image is not successfully verified.

13. An apparatus, comprising:
  a processor operable to execute instructions;
  a non persistent memory embedded within an integrated circuit; and
  a persistent memory embedded within the integrated circuit, wherein the apparatus is configured to:
    provide an encrypted image to a central processing unit of an integrated circuit;
    decrypt the encrypted image using a first cryptographic key element, wherein the first cryptographic key element and a second cryptographic key element are embedded within the integrated circuit during a manufacturing process associated with the integrated circuit, wherein the first cryptographic key element and the second cryptographic key element are arranged in a hierarchy in which the first cryptographic element corresponds to a product family of devices and the second cryptographic element corresponds to the integrated circuit for enabling a particular type of deployment;
    utilize an executable and linkable format (ELF) to signify that encryption has been enabled for at least a portion of the encrypted image;
    evaluate the decrypted image in order to verify its authenticity; and
    execute the decrypted image if the decrypted image is successfully verified.

14. The apparatus of claim 13, wherein the integrated circuit further comprises a plurality of bus lines embedded within the integrated circuit and configured to couple the central processing unit and the integrated circuit.

15. The apparatus of claim 13, wherein the processor within the integrated circuit is provided with the first cryptographic key element that corresponds to a product family of devices, and wherein the processor is further provided with an additional cryptographic key element that corresponds to a unique identifier of the processor.

16. The apparatus of claim 13, wherein a cipher is included in header information associated with the encrypted image, and wherein the header information includes a decrypted key.

17. The apparatus of claim 13, further comprising a hashing element, wherein the first cryptographic key element is used in a symmetric encryption decryption operation involving the hashing element, which is provided within the integrated circuit.

\* \* \* \* \*